(12) United States Patent
Oliver

(10) Patent No.: US 8,045,808 B2
(45) Date of Patent: Oct. 25, 2011

(54) PURE ADVERSARIAL APPROACH FOR IDENTIFYING TEXT CONTENT IN IMAGES

(75) Inventor: Jonathan James Oliver, Kew (AU)

(73) Assignee: Trend Micro Incorporated, Tokyo (JP)

( * ) Notice: Subject to any disclaimer, the term of this patent is extended or adjusted under 35 U.S.C. 154(b) by 1089 days.

(21) Appl. No.: 11/893,921

(22) Filed: Aug. 16, 2007

(65) Prior Publication Data

US 2008/0131006 A1 Jun. 5, 2008

Related U.S. Application Data

(63) Continuation-in-part of application No. 11/803,963, filed on May 16, 2007.

(60) Provisional application No. 60/872,928, filed on Dec. 4, 2006.

(51) Int. Cl.
*G06K 9/72* (2006.01)
(52) U.S. Cl. .......................... 382/229; 382/218; 382/203
(58) Field of Classification Search .................. 382/229, 382/203, 217, 218
See application file for complete search history.

(56) References Cited

U.S. PATENT DOCUMENTS

2005/0216564 A1 9/2005 Myers et al.
2008/0008348 A1* 1/2008 Metois et al. ................. 382/100

OTHER PUBLICATIONS

Gatos et al. "A Segmentation-free Approach for Keyword Search in Historical Typewritten Documents." Proceedings of the Eighth International Conference on Document Analysis and Recognition, Aug. 29, 2005, 5 pages.*

Chen et al. "Detecting and Locating Partially Specified Keywords in Scanned Images Using Hidden Markov Models." Proceedings of the Second International Conference on Document Analysis and Recognition, Oct. 20, 1993, 6 pages.*
G S Lehal, et al. "A Shape Based Post Processor for Gurmukhi OCR", 2001 IEEE, pp. 1105-1109, Punjabi University, India.
Jeff DeCurtins, et al. "Keyword spotting via word shape recognition", Feb. 6, 1995, pp. 270-277, SPIE vol. 2422, XP 000642554.
PCT International Search Report for Application No. PCT/JP2007/071448 (4 sheets).
"Avira Warns: New Spam Wave With Anti OCR Techniques", Nov. 17, 2006, p. 1 [retrieved on Apr. 19, 2007]. Retrieved from the internet: <http://www.avira.com/en/security_news/ocr_spam_wave.html>.
"Barracuda Spam Firewell Protects Customers From Growing Incidence of Image Spam", Jul. 19, 2006, p. 1 [retrieved on Apr. 19, 2007] [retrieved from the internet: <http://www.barracudanetworks.com/ns/news_and_events/index.php?nid=105>.

(Continued)

*Primary Examiner* — Jon Chang
(74) *Attorney, Agent, or Firm* — Okamoto & Benedicto LLP

(57) ABSTRACT

A pure adversarial optical character recognition (OCR) approach in identifying text content in images. An image and a search term are input to a pure adversarial OCR module, which searches the image for presence of the search term. The image may be extracted from an email by an email processing engine. The OCR module may split the image into several character-blocks that each has a reasonable probability of containing a character (e.g., an ASCII character). The OCR module may form a sequence of blocks that represent a candidate match to the search term and calculate the similarity of the candidate sequence to the search term. The OCR module may be configured to output whether or not the search term is found in the image and, if applicable, the location of the search term in the image.

17 Claims, 12 Drawing Sheets

OTHER PUBLICATIONS

Optical Character Recognition from Wikipedia, the free encyclopedia; pp. 1-5, [retrieved on Apr. 19, 2007] [retrieved from the internet: <http://en.wikipedia.org/wiki/Optical_character_recognition>.

OcrPlugin—Spamassassin Wiki, Aug. 28, 2006, pp. 1-4 [retrieved on Apr. 19, 2007] [retrieved from the internet: <http://wiki.apache.org/spamassassin/OcrPlugin?action=print>.

Mehran Sahami, Susan Dumais, David Heckerman and Eric Horvitz, "A Bayesian Approach to Filtering Junk E-Mail" AAA1'98 Workshop on Learning for Text Categorization, Jul. 27, 1998, Madison, Wisconsin.

Serge Belongie, Jitendra Malik and Jan Puzicha, "Shape Matching and Object Recognistion Using Shape Contexts", Apr. 24, 2002, pp. 509-522, Transactions on Pattern Analysis and Machine Intelligence, vol. 24, No. 24. IEEE 2002.

"SunbeltBLOG: Image Spam", May 2, 2006, pp. 1-2 [retrieved on Apr. 19, 2007] [retrieved from the internet: <http://sunbeltblog.blogspot.com/2006/05/image-spam.html>.

Messagelabs website—Email Control, pp. 1-4, [retrieved on Apr. 19, 2007] [retrieved from the internet<www.messagelabs/com/Services/Email_Services/Email_Control>.

Seunghak Lee, Iryoung Jeong and Seungjin Choi, "Dynamically Weighted Hidden Markov Model for Spam Deobfuscation", pp. 2523-2529, IJCAI-07.

Honglak Lee and Andrew Y. Ng, "Spam Deobfuscation Using a Hidden Markov Model", 8 sheets, Proceedings of the Second Conference on Email and Anti-Spam, CEAS 2005.

Eric Sven Ristad and Peter N. Yianilos, "Learning String Edit Distance", Research Report CS-TR-532-96, pp. 1-33, Oct. 1997. Department of Computer Science, Princeton University.

Edit Distance from Wikipedia, the free encyclopedia. Mar. 20, 2007, p. 1 [retrieved on May 12, 2007] [retrieved from the internet<http://en.wikipedia.org/wiki/Edit_distance>.

Dynamic Programming Algorithm (DPA) for Edit-Distance from Monash University website, 1999, pp. 1-5 [retrieved on May 12, 2007] [retrieved from the internet:<www.csse.monash.edu.au/~lloyd/tildeAlgDS/Dynamic/Edit/>.

Jonathan Oliver, "Using Lexigraphical Distancing to Block Spam" Jan. 21, 2005, pp. 1-14, MailFrontier—Email is good again, Spam Conference.

Optical Character Recognition from Wikipedia, the free encyclopedia, pp. 1-5 [retrieved on Jul. 12, 2007] [retrieved from the internet:<http://en.wikipedia.org/wiki/Optical_character_recognition>.

Cheng-Lin Liu and Hiromichi Fujisawa, "Classification and Learning for Character Recognition: Comparison of Methods and Remaining Problems", 7 sheets [retrieved on Jul. 13, 2007] [retrieved from the internet:<www.dsi.unifi.it/NNLDAR/Papers/01-NNLDAR05-Liu.pdf>.

Open-Source Character Recognition from GOCR website, pp. 1-2 [retrieved on Jul. 13, 2007] [retrieved from the internet:<http://jocr.sourceforge.net/>.

Dynamic Programming Algorithm for Sequence Alignment, pp. 1-3 [retrieved on Aug. 9, 2007] [retrieved from the internet<http://www.csse.monash.edu.au/~lloyd/tildeStrings/Notes/DPA.html>.

Battista Biggio, Giorgio Fumera, Ignazio Pillai and Fabio Roli, "Image Spam Filtering by Content Obscuring Detection", 5 sheets, Aug. 2-3, 2007, Fourth Conference on Email and Anti-Spam CEAS 2007, California.

Zhe Wang, William Josephson, Qin Lv, Moses Charikar and Kai Li, "Filtering Image Spam with Near-Duplicate Detection", 10 sheets, Aug. 2-3, 2007, Fourth Conference on Email and Anti-Spam CEAS 2007.

Mark Dredze, Reuven Gevaryahu and Ari Elias-Bachrach, "Learning Fast Classifiers for Image Spam", 9 sheets, Aug. 2-3, 2007, Fourth Conference on Email and Anti-Spam CEAS 2007.

Byungki Byun, Chin-Hui Lee, Steve Webb and Calton Pu, "A Discriminative Classifier Learning Approach to Image Modeling and Spam Image Identification", 9 sheets, Aug. 2-3, 2007, Fourth Conference on Email and Anti-Spam CEAS 2007.

* cited by examiner

*Spammer Terms extracted using Adversarial OCR* trading
tradingalert
alert
trade
tradedate
currentprice
strongbuy
trading
tradingalert
alert

FIG. 10A

DISCOUNTED PHARMA

BUY BULK AND SAVE 80%

WE SHIP WORLDWIDE!
OUR SITE VERIFIED BY VISA!

CLICK HERE

FIG. 10B

Huge News Expected to Impact CYTV

China YouTV Corp.
Symbol: CYTV
Close $1.49

We have already seen CYTV's market impact over the last week. Friday's news release concerning video sharing brought to the mobile phone market will put this over the top. Read the news, think about the impact, and jump on this first thing Monday morning!

FIG. 10C

*Only we offer:*

-All popular drugs are available (Viagra, Cialis, Levitra and many many more)
-Free shipping worldwide
-No Doctor Visits
-No Prescriptions
-100% Customer Satisfaction

*Todays special offers:*
Viagra only $1.36 per 100mg
Cialis only $3.00 per 20mg
Levitra only $3.33.00 per 20mg

*And special ED packs...*
*... and many many more.*

FIG. 10D

Symbol: CBFE
Price: $1.55 (UP 11.51%)
Target: $4
Market: Bullish

FIG. 10E

Discount Pharmacy Online
Do not click, type in your browser
http://www.RXmart.org

| Viagra | 100mg | Only $2.00 per pill |
|---|---|---|
| Cialis | 20 mg | Only $2.00 per pill |
| Ambien | 10 mg | Only $2.00 per pill |
| Xanex | 1 mg | Only $2.00 per pill |
| Phentemine | 375 mg | Only $4.17 per pill |
| Valium | 10 mg | Only $2.00 per pill |

Save up to 80%

Do not click, just type http://www.RXmart.org in address bar of your browser, then press entre key

FIG. 10F

Huge News Expected To Impact CYTV

China YouTV Corp
Symbol: CYTV
Close $1.46

We have already seen CYTV's market impact over the last week. Friday's news release concerning video sharing brought to the mobile phone market will put this over the top. Read the news, think about the impact and jump on this first thing Monday morning!

PURE ADVERSARIAL APPROACH FOR IDENTIFYING TEXT CONTENT IN IMAGES

CROSS-REFERENCE TO RELATED APPLICATIONS

This application is a continuation-in-part of U.S. patent application Ser. No. 11/803,963, filed on May 16, 2007, which claims the benefit of U.S. Provisional Application No. 60/872,928, filed on Dec. 4, 2006.

This application claims the benefit of U.S. Provisional Application No. 60/872,928, filed on Dec. 4, 2006.

The above-identified U.S. Provisional and Patent Applications are incorporated herein by reference in their entirety.

BACKGROUND OF THE INVENTION

1. Field of the Invention

The present invention relates generally to computer security, and more particularly but not exclusively to methods and apparatus for identifying text content in images.

2. Description of the Background Art

Electronic mail ("email") has become a relatively common means of communication among individuals with access to a computer network, such as the Internet. Among its advantages, email is relatively convenient, fast, and cost-effective compared to traditional mail. It is thus no surprise that a lot of businesses and home computer users have some form of email access. Unfortunately, the features that make email popular also lead to its abuse. Specifically, unscrupulous advertisers, also known as "spammers," have resorted to mass emailings of advertisements over the Internet. These mass emails, which are also referred to as "spam emails" or simply "spam," are sent to computer users regardless of whether they asked for them or not. Spam includes any unsolicited email, not just advertisements. Spam is not only a nuisance, but also poses an economic burden.

Previously, the majority of spam consisted of text and images that are linked to websites. More recently, spammers are sending spam with an image containing the inappropriate content (i.e., the unsolicited message). The reason for embedding inappropriate content in an image is that spam messages can be distinguished from normal or legitimate messages in at least two ways. For one, the inappropriate content (e.g., words such as "Viagra", "free", "online prescriptions," etc.) can be readily detected by keyword and statistical filters (e.g., see Sahami M., Dumais S., Heckerman D., and Horvitz E., "A Bayesian Approach to Filtering Junk E-mail," AAAI'98 Workshop on Learning for Text Categorization, 27 Jul. 1998, Madison, Wis.). Second, the domain in URLs (uniform resource locators) in the spam can be compared to databases of known bad domains and links (e.g., see Internet URL <www dot surbl dot org).

In contrast, a spam email where the inappropriate content and URLs are embedded in an image may be harder to classify because the email itself does not contain obvious spammy textual content and does not have a link/domain that can be looked up in a database of bad links/domains.

Using OCR (optical character recognition) techniques to identify spam images (i.e., images having embedded spammy content) have been proposed because OCR can be used to identify text in images. In general, use of OCR for anti-spam applications would involve performing OCR on an image to extract text from the image, scoring the extracted text, and comparing the score to a threshold to determine if the image contains spammy content. Examples of anti-spam applications that may incorporate OCR functionality include the SpamAssassin and Barracuda Networks spam filters. Spammers responded to OCR solutions in spam filters with images deliberately designed with anti-OCR features. Other approaches to combat spam images include flesh-tone analysis and use of regular expressions.

The present invention provides a novel and effective approach for identifying content in an image even when the image has anti-OCR features.

SUMMARY

In one embodiment, an image and a search term are input to a pure adversarial OCR module configured to search the image for presence of the search term. The image may be extracted from an email by an email processing engine. The OCR module may split the image into several character-blocks that each has a reasonable probability of containing a character (e.g., an ASCII character). The OCR module may form a sequence of blocks that represent a candidate match for the search term and estimate the probability of a match between the sequence of blocks and the search term. The OCR module may be configured to output whether or not the search term is found in the image and, if applicable, the location of the search term in the image. Embodiments of the present invention may be employed in a variety of applications including, but not limited to, antispam, anti-phishing, email scanning for confidential or prohibited information, etc.

These and other features of the present invention will be readily apparent to persons of ordinary skill in the art upon reading the entirety of this disclosure, which includes the accompanying drawings and claims.

DESCRIPTION OF THE DRAWINGS

FIGS. 10A-10F show example images that contain anti-OCR features.

FIGS. 11, 14, and 15 show example character-blocks.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
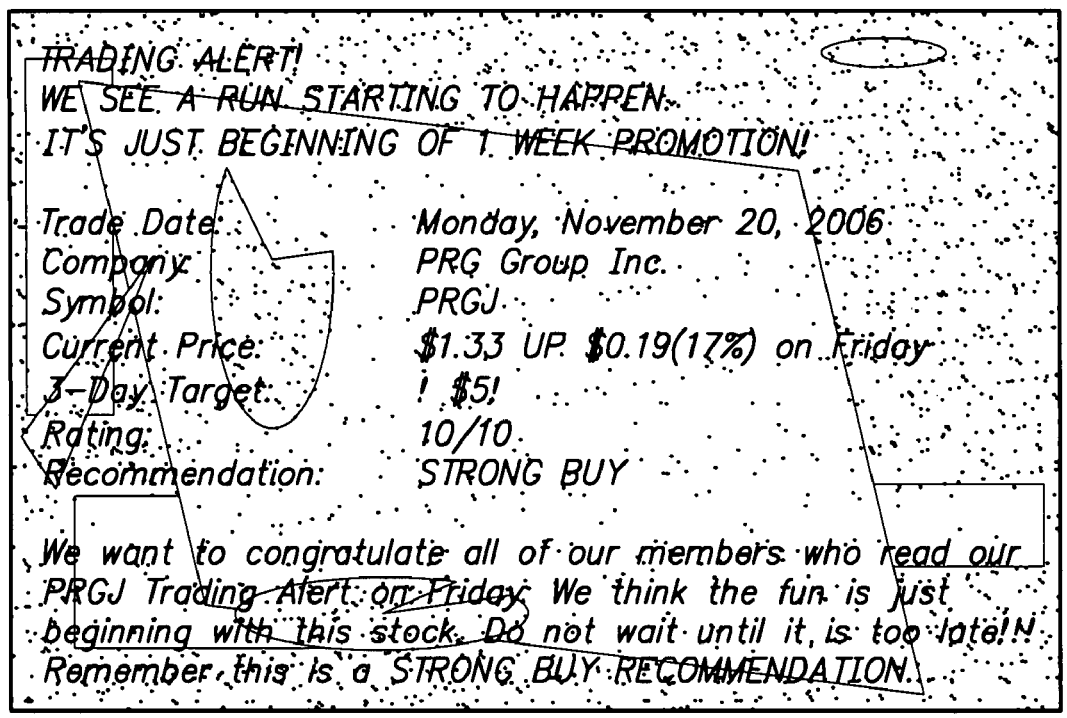
FIG. 1 shows an example image included in a spam.
Figure 2:
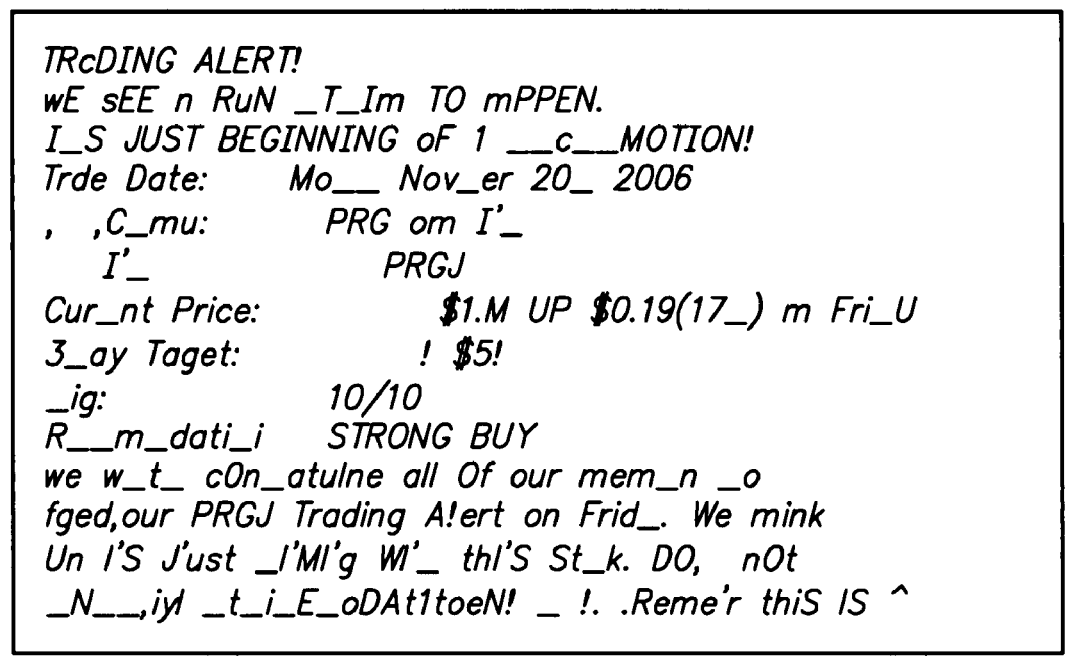
FIG. 2 shows text extracted from the image of FIG. 1 by optical character recognition.

FIG. 1 shows an example image included in a spam. The spam image of FIG. 1 includes anti-OCR features in the form of an irregular background, fonts, and color scheme to confuse an OCR module. FIG. 2 shows the text extracted from the image of FIG. 1 using conventional OCR process. The anti-OCR features fooled the OCR module enough to make the text largely unintelligible, making it difficult to determine if the image contains inappropriate content, such as those commonly used in spam emails.

Figure 3:
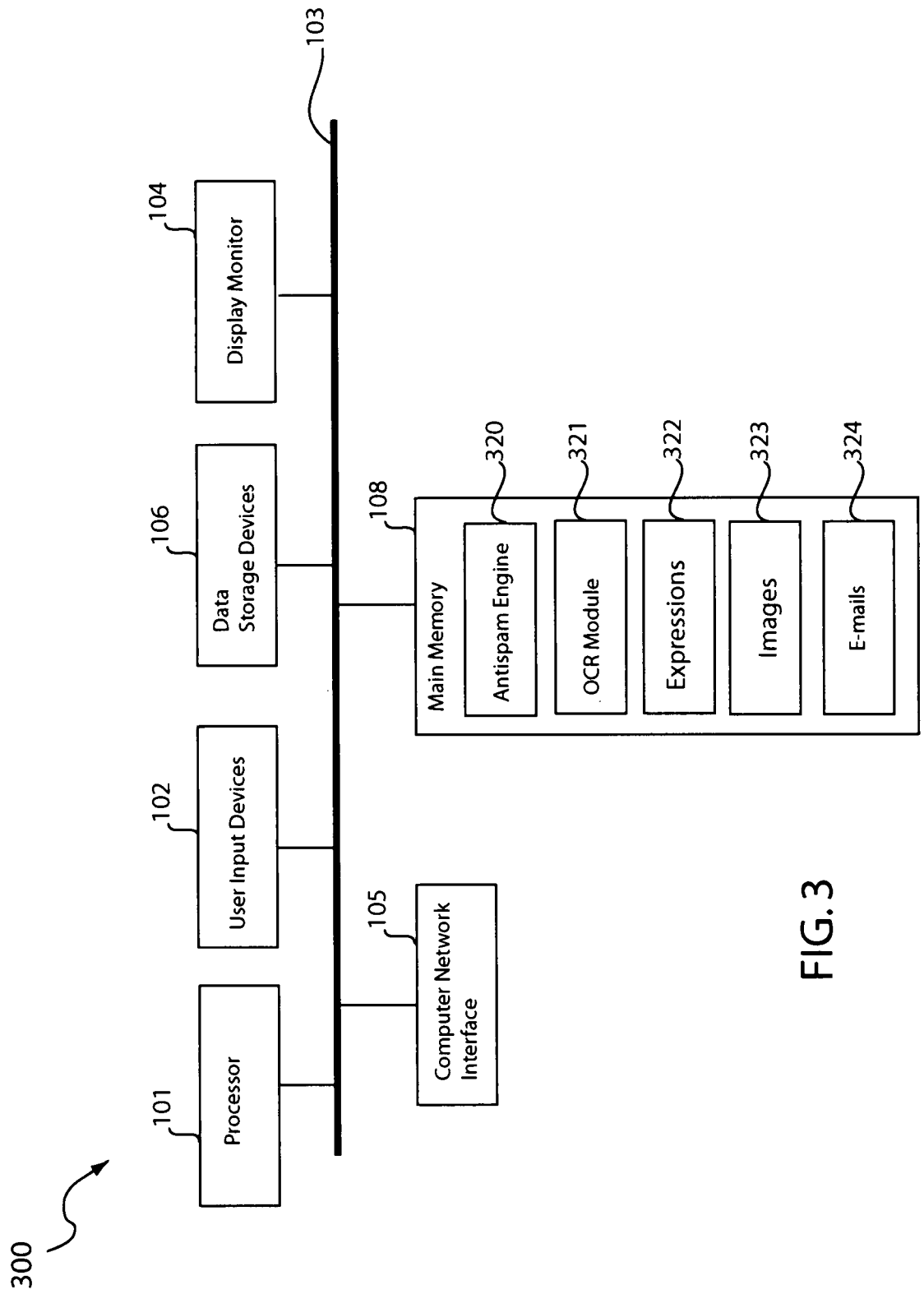
FIG. 3 shows a schematic diagram of a computer in accordance with an embodiment of the present invention.

Referring now to FIG. 3, there is shown a schematic diagram of a computer 300 in accordance with an embodiment of the present invention. The computer 300 may have less or more components to meet the needs of a particular application. The computer 300 may include a processor 101, such as those from the Intel Corporation or Advanced Micro Devices, for example. The computer 300 may have one or more buses 103 coupling its various components. The computer 300 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). In the example of FIG. 1, the main memory 108 includes an antispam engine 320, an OCR module 321, expressions 322, images 323, and emails 324. The components shown as being in the main memory 108 may be loaded from a data storage device 106 for execution or reading by the processor 101. For example, the emails 324 may be received over the Internet by way of the computer network interface 105, buffered in the data storage device 106, and then loaded onto the main memory 108 for processing by the antispam engine 320. Similarly, the antispam engine 320 may be stored in the data storage device 106 and then loaded onto the main memory 108 to provide antispam functionalities in the computer 300.

The antispam engine 320 may comprise computer-readable program code for identifying spam emails or other data with inappropriate content, which may comprise text that includes one or more words and phrases identified in the expressions 322. The antispam engine 320 may be configured to extract an image 323 from an email 324, use the OCR module 321 to extract text from the image 323, and process the extracted text output to determine if the image 323 includes inappropriate content, such as an expression 322. For example, the antispam engine 320 may be configured to determine if one or more expressions in the expressions 322 are present in the extracted text. The antispam engine 320 may also be configured to directly process the image 323, without having to extract text from the image 323, to determine whether or not the image 323 includes inappropriate content. For example, the antispam engine 320 may directly compare the expressions 322 to sections of the image 323. The antispam engine 320 may deem emails 324 with inappropriate content as spam.

The OCR module 321 may comprise computer-readable program code for extracting text from an image. The OCR module 321 may be configured to receive an image in the form of an image file or other representation and process the image to generate text from the image. The OCR module 321 may comprise a conventional OCR module. In one embodiment, the OCR module 321 is employed to extract embedded texts from the images 323, which in turn are extracted from the emails 324.

The expressions 322 may comprise words, phrases, terms, or other character combinations or strings that may be present in spam images. Examples of such expressions may include "brokers," "companyname" (particular companies), "currentprice," "5daytarget," "strongbuy," "symbol," "tradingalert" and so on. The expressions 322 may be obtained from samples of confirmed spam emails, for example.

As will be more apparent below, embodiments of the present invention are adversarial in that they select an expression from the expressions 322 and specifically look for the selected expression in the image, either directly or from the text output of the OCR module 321. That is, instead of extracting text from an image and querying whether the extracted text is in a listing of expressions, embodiments of the present invention ask the question of whether a particular expression is in an image. The adversarial approach allows for better accuracy in identifying inappropriate content in images in that it focuses search for a particular expression, allowing for more accurate reading of text embedded in images.

The emails 324 may comprise emails received over the computer network interface 105 or other means. The images 323 may comprise images extracted from the emails 324. The images 324 may be in any conventional image format including JPEG, TIFF, etc.

Figure 4:
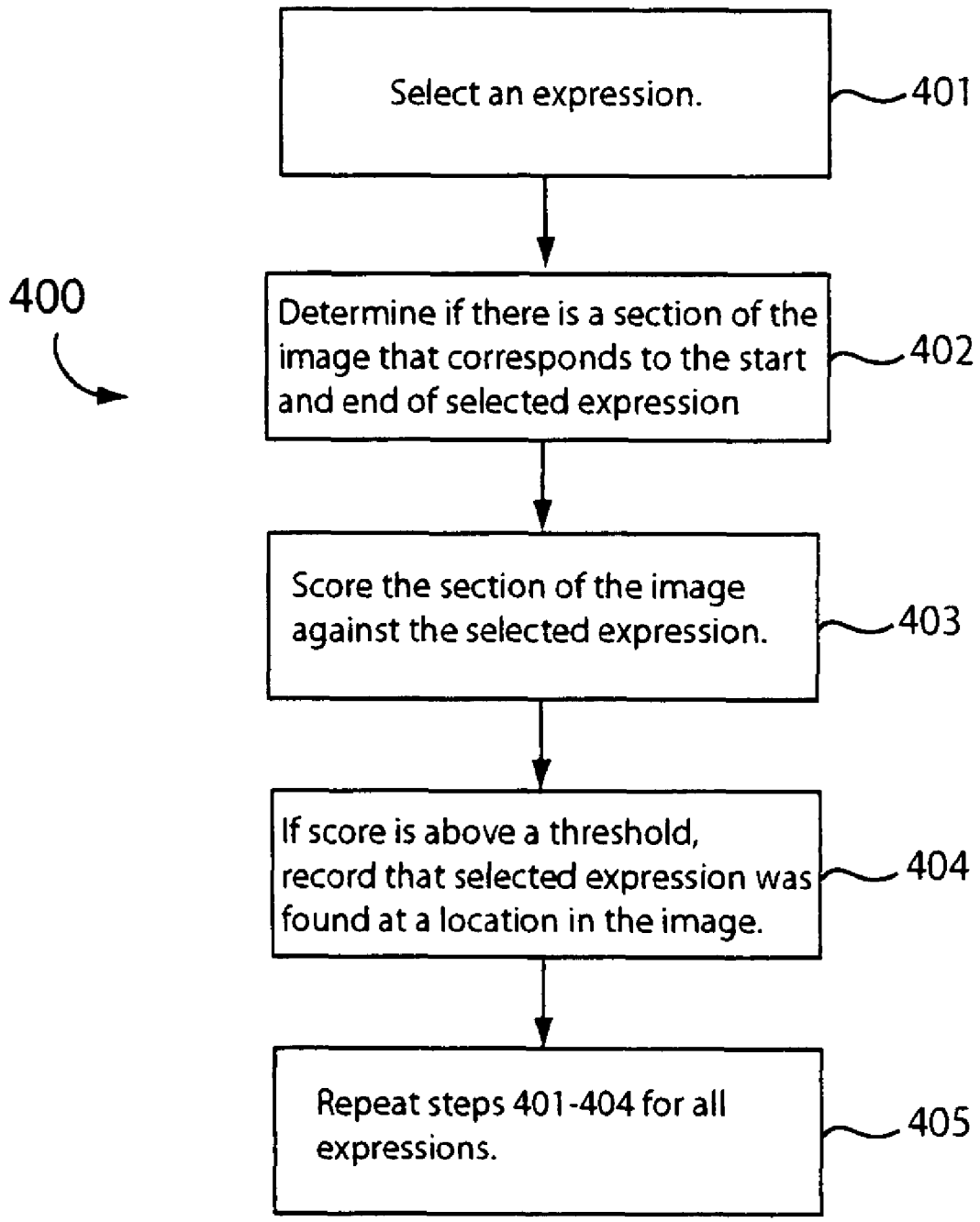
FIG. 4 shows a flow diagram of a method of identifying inappropriate text content in images in accordance with an embodiment of the present invention.

FIG. 4 shows a flow diagram of a method 400 of identifying inappropriate text content in images in accordance with an embodiment of the present invention. FIG. 4 is explained using the components shown in FIG. 3. Other components may also be used without detracting from the merits of the present invention.

The method 400 starts after the antispam engine 320 extracts an image 323 from an email 324. The antispam engine 320 then selects an expression from the expressions 322 (step 401). Using the selected expression as a reference, the antispam engine 320 determines if there is a section of the image 323 that corresponds to the start and end of the selected expression (step 402). That is, the selected expression is used as a basis in finding a corresponding section. For example, the antispam engine 320 may determine if the image 323 includes a section that looks similar to the selected expression 322 in terms of shape. The antispam engine 320 then compares the selected expression 322 to the section to determine the closeness of the selected expression 322 to the section. In one embodiment, this is performed by the antispam engine 320 by scoring the section against the selected expression (step 403). The score may reflect how close the selected expression 322 is to the section. For example, the higher the score, the higher the likelihood that the selected expression 322 matches the section. A minimum threshold indicative of the amount of correspondence required to obtain a match between an expression 322 and a section may be predetermined. The value of the threshold may be obtained and optimized empirically. If the score is higher than the threshold, the antispam engine 320 may deem the selected expression 322 as being close enough to the section that a match is obtained, i.e., the selected expression 322 is deemed found in the image 323 (step 404). In that case, the antispam engine 320 records that the selected expression was found at the location of the section in the image 323. For each image 323, the antispam engine 320 may repeat the above-described process for each of the expressions 322 (step 405). A separate scoring procedure may be performed for all identified expressions 322 to determine whether or not the image is a spam image. For example, once the expressions 322 present in the image 323 have been identified, the antispam engine 320 may employ conventional text-based algorithms to determine if the identified expressions 322 are sufficient to deem the image 323 a spam image. The email 324 from which a spam image was extracted may be deemed as spam.

Figure 5:
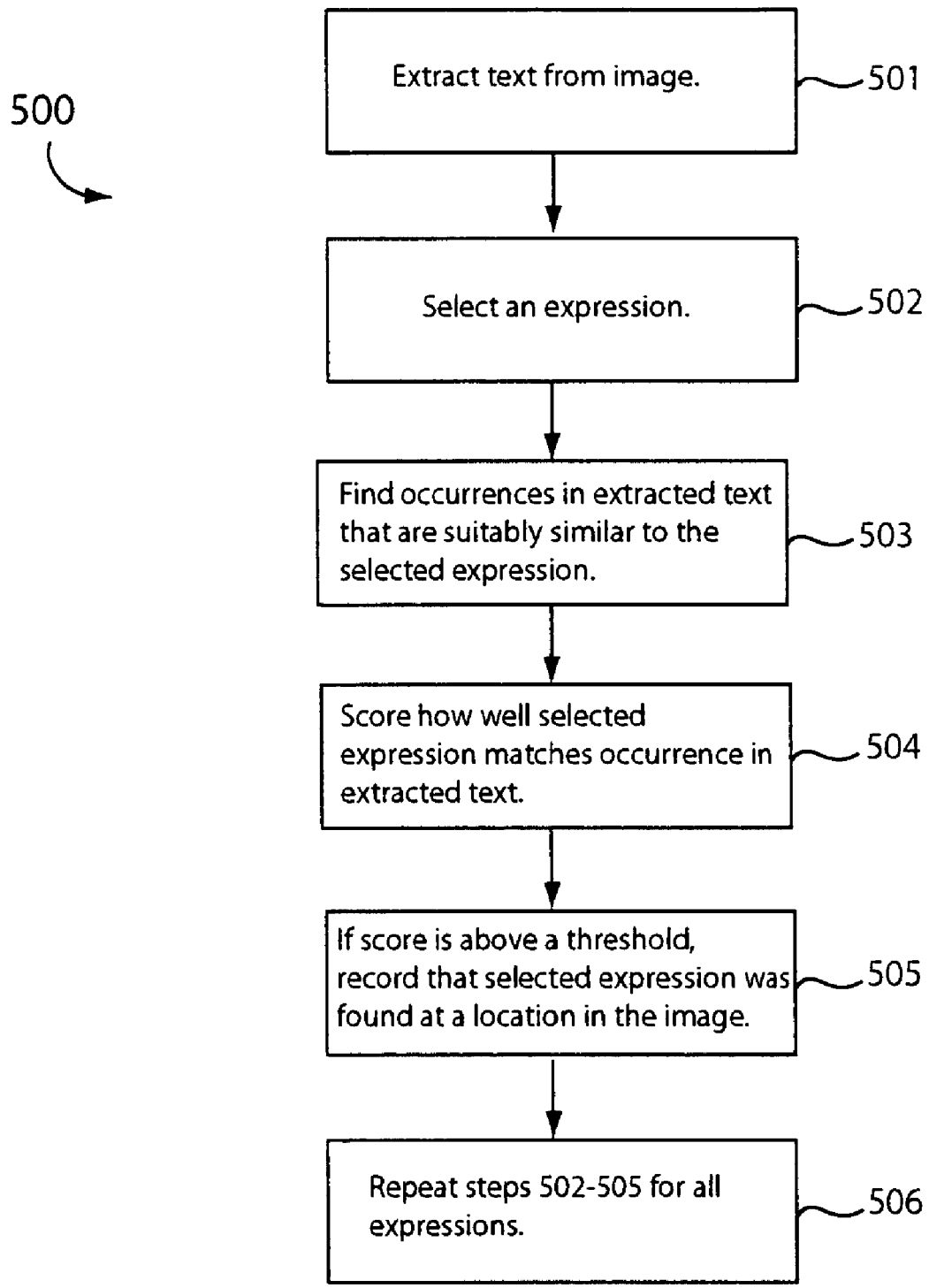
FIG. 5 shows a flow diagram of a method of identifying inappropriate text content in images in accordance with another embodiment of the present invention.

FIG. 5 shows a flow diagram of a method 500 of identifying inappropriate text content in images in accordance with another embodiment of the present invention. FIG. 5 is explained using the components shown in FIG. 3. Other components may also be used without detracting from the merits of the present invention.

The method 500 starts after the antispam engine 320 extracts an image 323 from an email 324. The OCR module 321 then extracts text from the image, hereinafter referred to as "OCR text output" (step 501). The antispam engine 320 selects an expression from the expressions 322 (step 502). Using the selected expression as a reference, the antispam engine 320 finds an occurrence in the OCR text output that is suitably similar to the selected expression 322 (step 503). For example, the antispam engine 320 may find one or more occurrences in the OCR text output that could match the beginning and end of the selected expression 322 in terms of shape. Conventional shape matching algorithms may be employed to perform the step 503. For example, the antispam engine may employ the shape matching algorithm disclosed in the publication "Shape Matching and Object Recognition Using Shape Contexts", S. Belongie, J. Malik, and J. Puzicha., IEEE Transactions on PAMI, Vol 24, No. 24, April 2002. Other shape matching algorithms may also be employed without detracting from the merits of the present invention.

The antispam engine 320 determines the closeness of the selected expression 322 to each found occurrence, such as by assigning a score indicative of how well the selected expression 322 matches each found occurrence in the OCR text output (step 504). For example, the higher the score, the higher the likelihood the selected expression 322 matches the found occurrence. The similarity between the selected expression 322 and a found occurrence may be scored, for example, using the edit distance algorithm or the viterbi algorithm (e.g., see "Using Lexigraphical Distancing to Block Spam", Jonathan Oliver, in Presentation of the Second MIT Spam Conference, Cambridge, Mass., 2005 and "Spam deobfuscation using a hidden Markov model", Honglak Lee and Andrew Y. Ng. in Proceedings of the Second Conference on Email and Anti-Spam (CEAS 2005)). Other scoring algorithms may also be used without detracting from the merits of the present invention.

In the method 500, a minimum threshold indicative of the amount of correspondence required to obtain a match between an expression 322 and a found occurrence may be predetermined. The value of the threshold may be obtained and optimized empirically. If the score of the step 504 is higher than the threshold, the antispam engine 320 may deem the selected expression 322 as being close enough to the occurrence that a match is obtained, i.e., the selected expression 322 is deemed found in the image 323 (step 505). In that case, the antispam engine 320 records that the selected expression was found at the location of the occurrence in the image 323. For each image 323, the antispam engine 320 may repeat the above-described process for each of the expressions 322 (step 506). A separate scoring procedure may be performed for all identified expressions 322 to determine whether or not the image is a spam image. For example, once the expressions 322 present in the image 323 have been identified, the antispam engine 320 may employ conventional text-based algorithms to determine if the identified expressions 322 are sufficient to deem the image 323 a spam image. The email 324 from which a spam image was extracted may be deemed as spam.

Figures 6, 7:
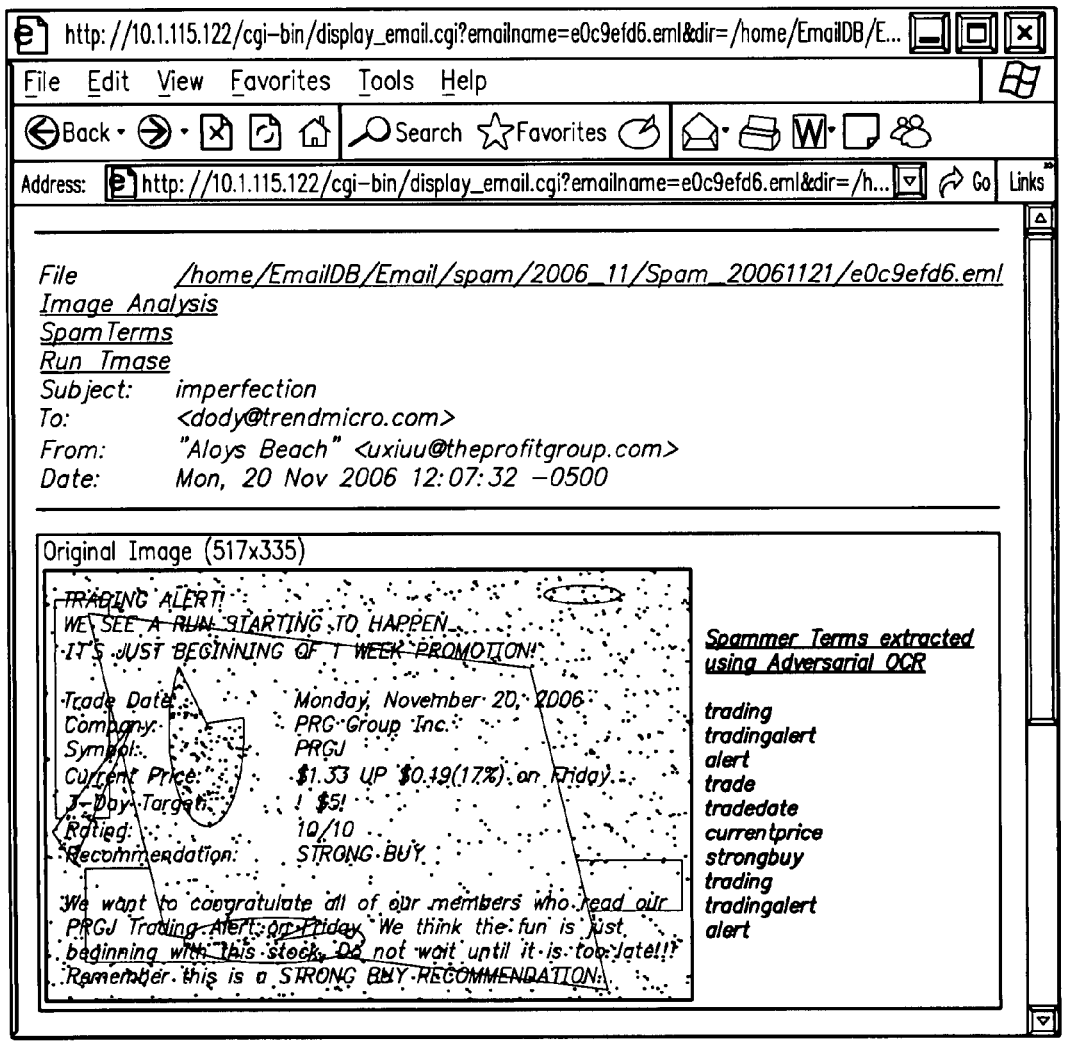
FIG. 6 shows a spam image included in an email and processed using the method of FIG. 5.
FIG. 7 shows inappropriate text content found in the spam image of FIG. 6 using the method of FIG. 5.

FIG. 6 shows a spam image included in an email and processed using the method 500. FIG. 7 shows the inappropriate text content found by the method 500 on the spam image of FIG. 6. Note that the inappropriate text content, which is included in a list of expressions 322, has been simplified for ease of processing by removing spaces between phrases.

Figure 8:
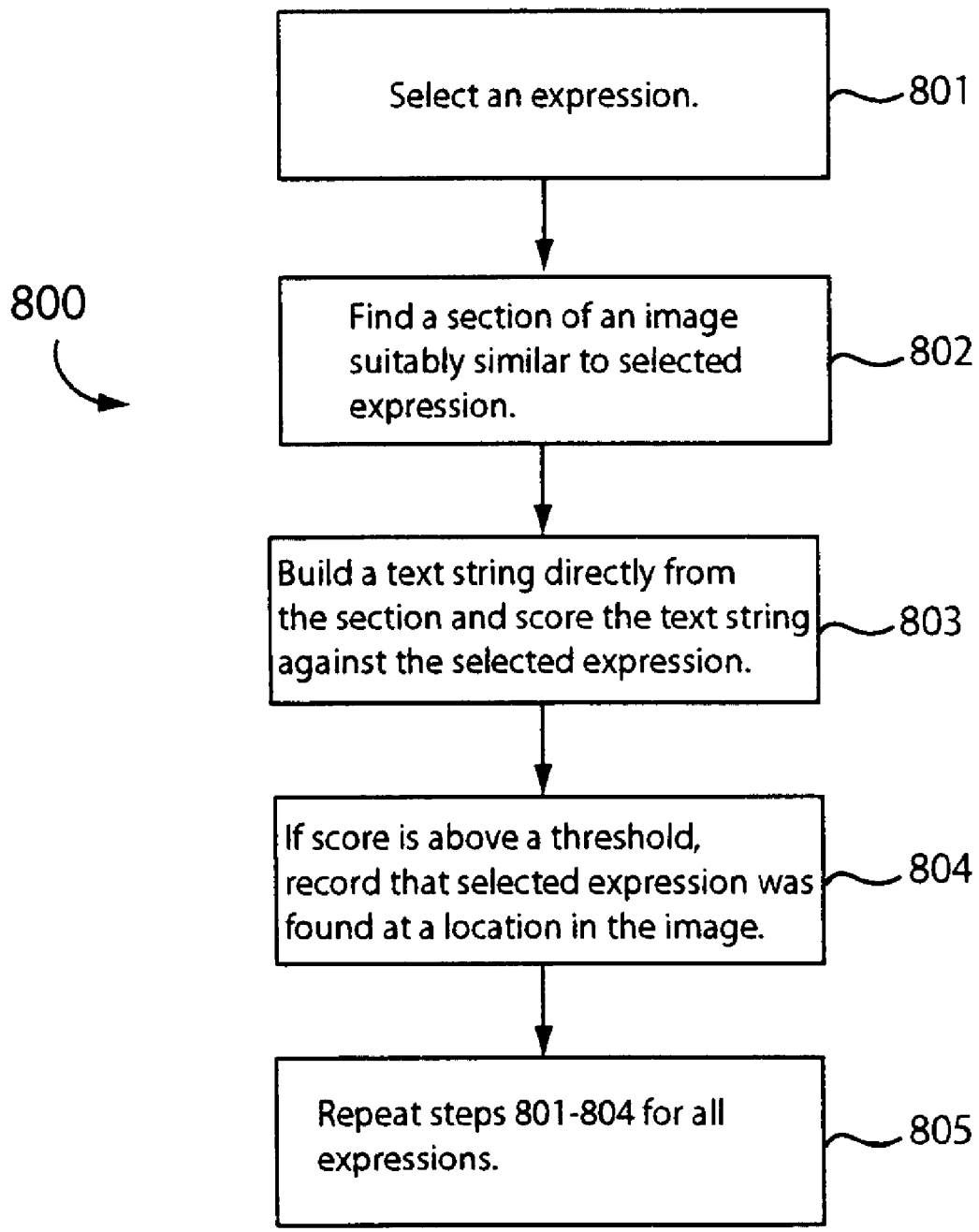
FIG. 8 shows a flow diagram of a method of identifying inappropriate text content in images in accordance with yet another embodiment of the present invention.

FIG. 8 shows a flow diagram of a method 800 of identifying inappropriate text content in images in accordance with yet another embodiment of the present invention. FIG. 8 is explained using the components shown in FIG. 3. Other components may also be used without detracting from the merits of the present invention.

The method 800 starts after the antispam engine 320 extracts an image 323 from an email 324. The antispam engine 320 then selects an expression from the expressions 322 (step 801). The antispam engine 320 finds a section in the image 323 that is suitably similar to the selected expression 322 (step 802). For example, the antispam engine 320 may find a section in the image 323 that could match the beginning and end of the selected expression 322 in terms of shape. A shape matching algorithm, such as that previously mentioned with reference to step 503 of FIG. 5 or other conventional shape matching algorithm, may be employed to perform the step 802.

The antispam engine 320 builds a text string directly (i.e., without first converting the image to text by OCR, for example) from the section of the image and then scores the text string against the selected expression to determine the closeness of the selected expression 322 to the found section (step 803). The higher the resulting score, the higher the likelihood the selected expression 322 matches the section. For example, to identify the text string, the antispam engine 320 may process the section of the image 323 between the potential start and end points that could match the selected expression 322. The pixel blocks in between the potential start and end points (a region of connected pixels) are then assigned probabilities of being the characters under consideration (for example the characters in the ASCII character set). The pixel blocks in between the potential start and end points are then scored using the aforementioned edit algorithm or viterbi algorithm to determine the similarity of the selected expression 322 to the found section.

In the method 800, a minimum threshold indicative of the amount of correspondence required to obtain a match between an expression 322 and a found section may be predetermined. The value of the threshold may be obtained and optimized empirically. If the score of the similarity between the selected expression 322 and the found section of the image 323 is higher than the threshold, the antispam engine 320 may deem the selected expression 322 as being close enough to the found section that there is a match, i.e., the selected expression 322 is deemed found in the image 323 (step 804). In that case, the antispam engine 320 records that the selected expression was found at the location of the section in the image 323. For each image 323, the antispam engine 320 may repeat the above-described process for each of the expressions 322 (step 805). A separate scoring procedure may be performed for all identified expressions 322 to determine whether or not an image is a spam image. For example, once the expressions 322 present in the image 323 have been identified, the antispam engine 320 may employ conventional text-based algorithms to determine if the identified expressions 322 are sufficient to deem the image 323 a spam image. The email 324 from which a spam image was extracted may be deemed as spam.

In light of the present disclosure, those of ordinary skill in the art will appreciate that embodiments of the present invention may be employed in applications other than antispam. This is because the above-disclosed techniques may be employed to identify text content in images in general, the images being present in various types of messages including emails, web page postings, electronic documents, and so on. For example, the components shown in FIG. 3 may be configured for other applications including anti-phishing, identification of confidential information in emails, identification of communications that breach policies or regulations in emails, and other computer security applications involving identification of text content in images. For anti-phishing applications, links to phishing sites may be included in the expressions 322. In that case, the antispam engine 320 may be configured to determine if an image included in an email has text content matching a link to a phishing site included in the expressions 322. Confidential (e.g., company trade secret information or intellectual property) or prohibited (e.g., text content that is against policy or regulation) information may also be included in the expressions 322 so that the antispam engine 320 may determine if such information is present in an image included in an email message.

Figure 9A:
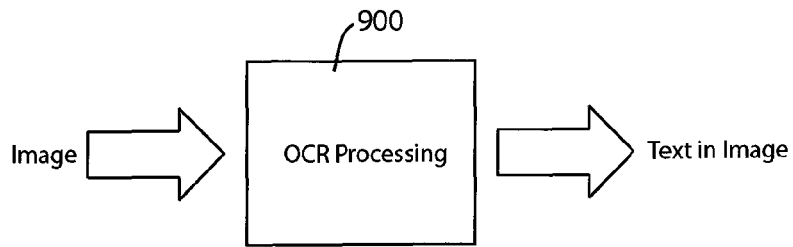
FIGS. 9A and 9B illustrate conventional OCR processing.
Figure 9B:
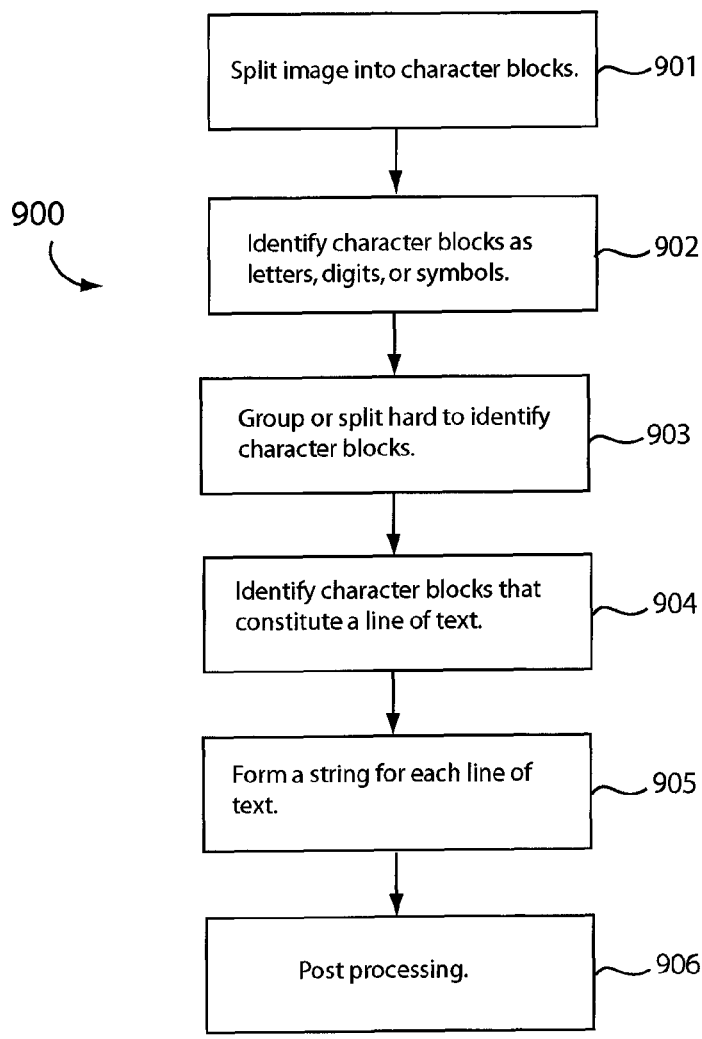

FIGS. 9A and 9B illustrate conventional OCR processing 900 for identifying text content in an image. As shown in FIG. 9A, OCR processing 900 takes an image as an input and outputs text found in the image. The OCR processing 900 is similar to GOCR and Tesseract OCR systems.

FIG. 9B shows a flow diagram of the OCR processing 900. The OCR processing 900 may be divided into several phases, labeled 901-906 in FIG. 9B. Phases 902, 903 and 904 may be performed in different order depending on the OCR application. In some applications, phases 902, 903 and 904 may be interspersed with each other.

OCR processing 900 begins with processing the image to split it into one or more character-blocks or other regions, each character-block potentially representing one or more characters (phase 901). The character-blocks are then processed to identify the most likely character (e.g., letters, digits, or symbols) the character-blocks represent (phase 902). This phase, phase 902, may be performed using a variety of techniques including handcrafted code (e.g., see GOCR) or using statistical approaches (e.g., see Cheng-Lin Liu and Hiromichi Fujisawa, "Classification and Learning for Character Recognition: Comparison of Methods and Remaining Problems"). Phase 902 will be most accurate if the character-blocks formed in phase 901 reflect single characters or the pixels set in the character-blocks are similar or match the pixels of the intended character.

Optionally, character-blocks that are difficult to identify in phase 902 may be grouped together into a single character-block or split apart into several character-blocks to make it easier to identify the possible character included in the character-block (phase 903). Character-blocks constituting a line of text are then identified (phase 904). For each line of text identified (in phase 904), a string is formed by concatenating the most likely characters represented (phase 905). Optionally, a post processing step may be performed on the output (from phase 905), such as spell check and other correction steps (phase 906).

As can be appreciated, embodiments of the present invention may be employed to identify terms, phrases, and other text in images in a variety of applications including in antispam, anti-phishing, and email processing to identify unauthorized emailing of confidential information or other information that breaches some policy or regulation. In these applications, an email may be created to include anti-OCR features to defeat OCR-based approaches. Conventional OCR processing approaches, such OCR processing 900, may be easily confused by these anti-OCR features, hence the need for the present invention.

Figures 11, 14, 15:
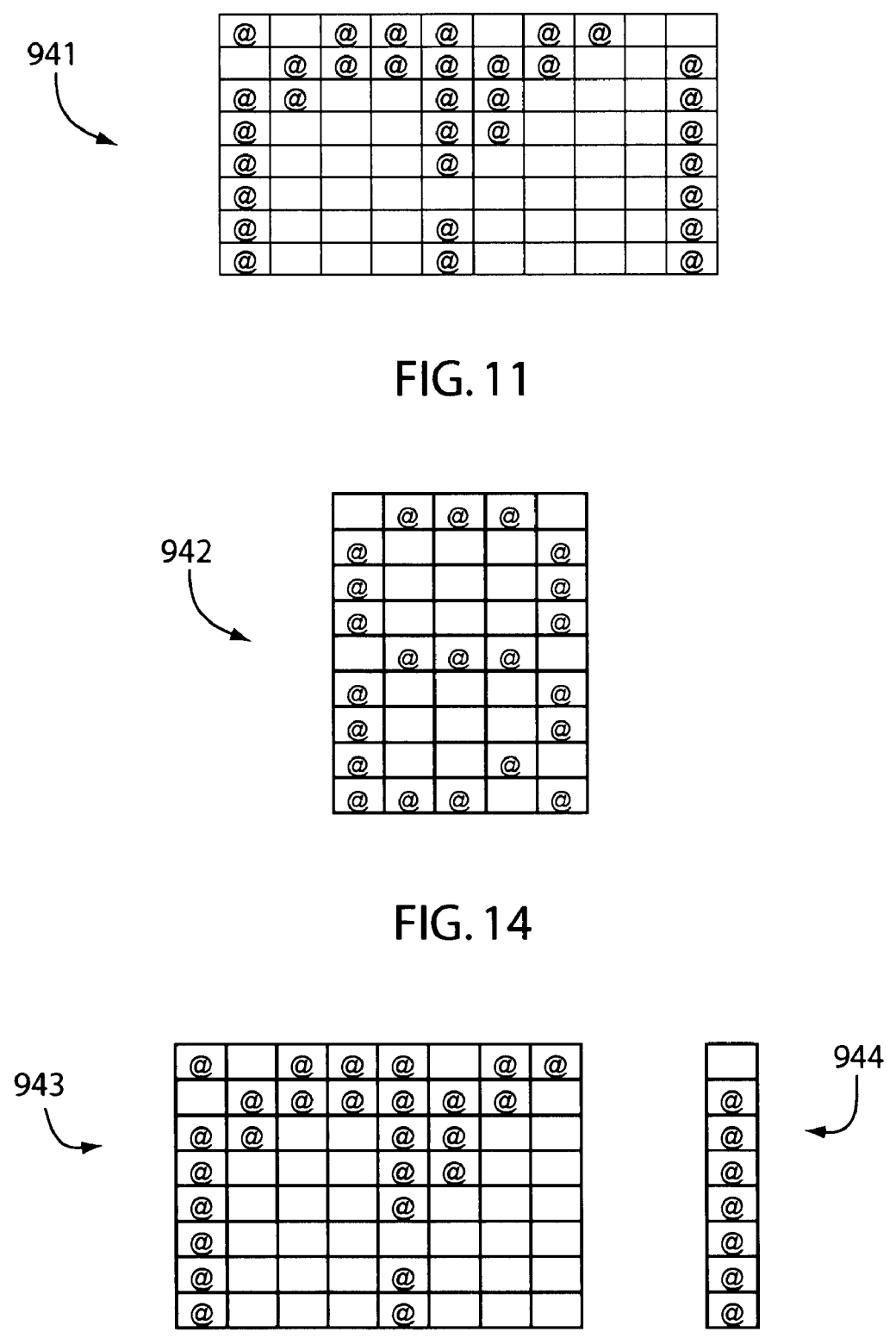

FIGS. 10A-10F show example images containing anti-OCR features. FIG. 10A shows an image with angled writing. FIG. 10B shows an image having a blurred background. FIG. 10C shows an image with cursive-like writing to make it difficult to form coherent character-blocks as in phase 901 of OCR processing 900. The reason that forming co-herent character blocks is difficult in that case is that in many cases the letters touch at the bottom, so with this image, the character blocks often contain two or more characters. FIG. 10D shows an image with underlined letters to lower the accuracy of identifying characters in character-blocks as in phase 902 of OCR processing 900. The image of FIG. 10D also has characters that go up and down to lower the accuracy of identifying character-blocks that constitute a line of text as in phase 904 of OCR processing 900. FIG. 10E shows an image having dots and speckles to increase the number of potential character-blocks and to lower the accuracy of identifying characters in character-blocks as in phase 902 of OCR processing 900, since the speckles and dots make it unclear which letter is intended. FIG. 10F shows an image with small gaps in the letters. For example, by clever use of a dark blue font, an OCR system may be tricked into identifying an "m" as two letters that look like an "n" and an "l" as in the pixel configuration of the character-block 941 of FIG. 11.

A pure adversarial OCR system may be employed to increase the accuracy of identifying search terms in images. A pure adversarial OCR system in accordance with an embodiment of the present invention is now described beginning with FIG. 12.

Figure 12:
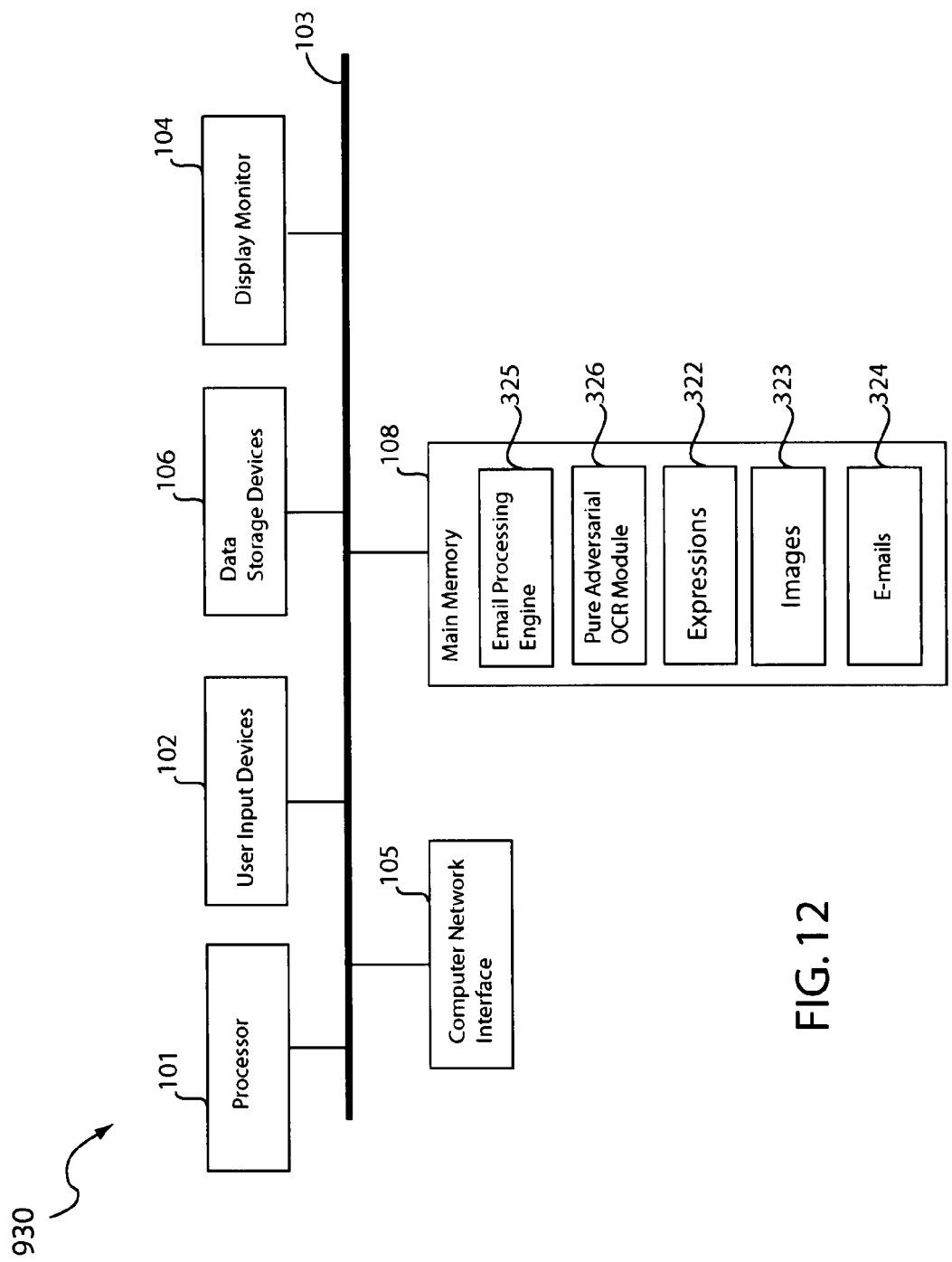
FIG. 12 shows a schematic diagram of a computer in accordance with an embodiment of the present invention.

FIG. 12 shows a schematic diagram of a computer 930 in accordance with an embodiment of the present invention. The computer 930 is the same as the computer 300 of FIG. 3, except for the use of an email processing engine 325 and a pure adversarial OCR module 326 instead of the antispam engine 320 and the OCR module 321.

The email processing engine 325 may comprise computer-readable program code for processing an email to perform one or more of a variety of applications including, antispam, anti-phishing, checking for confidential or other information for regulation or policy enforcement, and so on. The email processing engine 325 may be configured to extract an image 323 from an email 324 and use the adversarial OCR module 326 to identify text in the image 323. The email processing engine 325 may comprise conventional email processing software that uses OCR to identify text in images. For example, the email processing engine 325 may comprise conventional antispam software that would receive an email, extract an image from the email, forward the image to the adversarial OCR module 326 to identify text in the image, and to score the email based on the identified text.

The pure adversarial OCR module 326 may comprise computer-readable program code for extracting search terms and expressions from an image using a pure adversarial OCR approach. The adversarial OCR module 326 may be configured to receive an image in the form of an image file or other representation from the email processing engine 325 (or other programs), and process the image to identify text present in the image. The adversarial OCR module 326 may process an image using a pure adversarial OCR processing 920 described with reference to FIGS. 13A and 13B. The other components of the computer 930 have already been described with reference to the computer 300 of FIG. 3.

Figure 13A:
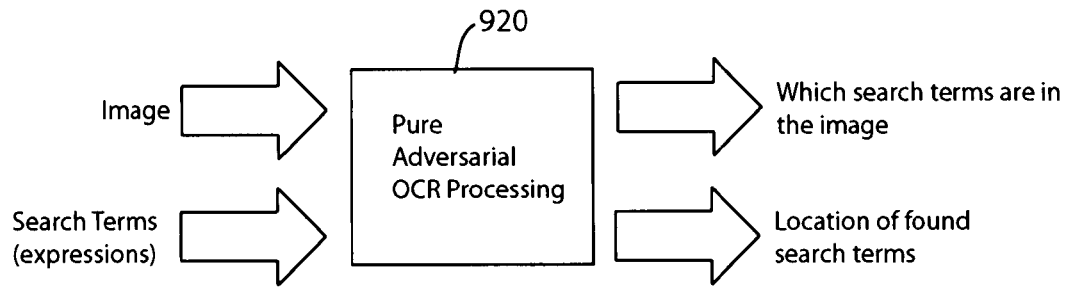
FIGS. 13A and 13B illustrate a pure adversarial OCR processing in accordance with an embodiment of the present invention.
Figure 13B:
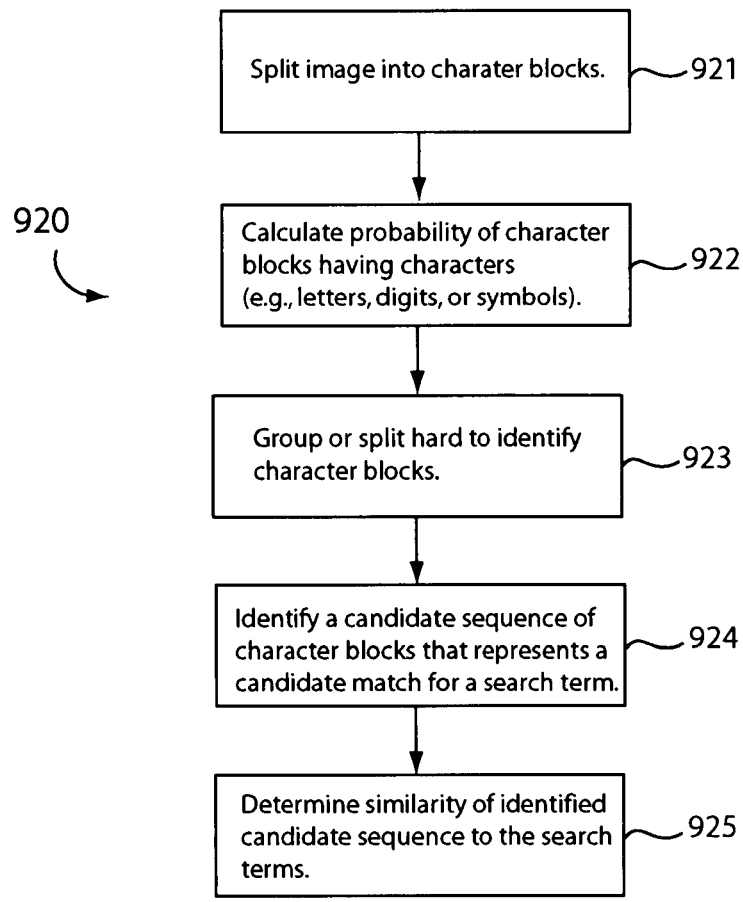

FIGS. 13A and 13B illustrate the pure adversarial OCR processing 920 in accordance with an embodiment of the present invention. As shown in FIG. 13A, the pure adversarial OCR processing 920 takes as inputs an image and search terms, and outputs the search terms found (if any) in the image and location of found search terms in the image. In one embodiment, the search terms comprise the expressions 322. That is, the OCR processing 920 may take in an image and expressions 322, look for the expressions 322 in the image, and provide information on the location of expressions 322 found in the image. This is in marked contrast to conventional OCR processing where an image is taken as an input and the OCR processing outputs text found in the image.

The pure adversarial OCR processing 920 may be performed in multiple phases or steps, as shown in the flow diagram of FIG. 13B. In phase 901, processing 920 begins by splitting the input image into character-blocks or other regions potentially having characters. Each character-block may comprise pixel information of a single character (e.g., ASCII character) or multiple characters. One way of performing phase 921 is to:

a) Grayscale the Image.
b) Determine pixels which are "set"—a set pixel is likely to be a part of a character. This can be done by straight forward approaches such as selecting a threshold and defining any pixel with a value above this threshold as being set. Alternatively, a criterion based on the pixel value and surrounding pixels can be applied to determine if the pixel is set.
c) Go through each pixel that is set and if the current pixel does not belong to an existing character-block then create a new character-block. Define all pixels that are connected to the current pixel by pixels that have been set as belonging to the current character-block. Two pixels may be deemed connected if they are both set and they are adjacent pixels either vertically or horizontally. Optionally, two pixels may also be deemed connected if they touch each other diagonally.

Phase 921 may also be performed using other techniques without detracting from the merits of the present invention.

In phase 922, the probability that each character-block formed in phase 921 contains a character, such as various letters, digits, or symbols, is calculated. Note that phase 922 does not necessarily require identification of the particular character that may be present in a character-block. This advantageously makes OCR processing 920 more robust compared to conventional OCR processing.

Phase 922 may be performed using handcrafted code as in GOCR or by using statistical approaches (e.g., see Cheng-Lin Liu and Hiromichi Fujisawa, "Classification and Learning for Character Recognition: Comparison of Methods and Remaining Problems"). For example, referring to FIG. 14, the character-block 942 might get assigned a reasonable probability (e.g., greater than 0.9) of being either the character "B", "8", or "&". This probability calculation may be performed using a support vector machine (SVM) by training an SVM using annotated data sets, taking the SVM score, and then normalizing the SVM score to obtain a probability estimate. Other techniques for calculating the probability that the character-blocks contain characters may also be employed without detracting from the merits of the present invention.

Phase 923 is an optional phase. In phase 923, character-blocks that are difficult to identify in phase 922 may be grouped together into a single character-block or split apart into several character-blocks.

If two character-blocks are close together (a single pixel in the example of FIG. 15) and one or both of them are difficult to identify (e.g., getting low probability of being assigned to characters) and combining the two character-blocks results in a character-block having a higher probability of being a character, then the two character-blocks can be combined. For example, referring to FIG. 15, the character-blocks 943 and 944 may be merged into character-blocks 941 of FIG. 11. The probability that character-block 941 contains a character may then be recalculated. Similar rules may be applied to split a single character-block to several character-blocks.

In phase 924, a candidate sequence of character-blocks is identified. Phase 924 may be performed by identifying one or more character-blocks that are likely to match the start of the search term, and identifying one or more character-blocks that are likely to match the end of the search term.

In phase 925, the similarity of the identified candidate sequence (in phase 924) to the input search terms is calculated. For example, a similarity score indicative of the similarity of a search term to the candidate sequence may be calculated and compared to a similarity threshold. The search term may be deemed to be present in the image if the similarity score is greater than the threshold. The threshold may be determined empirically, for example. Phase 925 may be performed using various techniques including a dynamic programming approach or the viterbi algorithm (e.g., see "Dynamic Programming Algorithm for Sequence Alignment", by Lloyd Allison at Internet URL www dot csse dot monash dot edu dot au/~lloyd/tildeStrings/Notes/DPA dot html). Other techniques for evaluating similarities may also be used without detracting from the merits of the present invention.

To illustrate phase 925, consider matching a candidate sequence of character-blocks that have the following probability estimates calculated in phase 922.

CB 1. Prob(S/s/5)=80%
CB 2. Prob(y)=80%
CB 2. Prob(g/j)=15%
CB 3. Prob(m)=80%
CB 3. Prob(n)=15%
CB 4. Prob(B/8/&)=80%
CB 4. Prob(E)=15%
CB 5. Prob(o/O/0)=80%
CB 5. Prob(Q/C)=15%
CB 6. Prob(l/i/l/I/!)=80%
CB 6. Prob(:)=15%

Where "CB 1" is the first character-block, having a probability of 80% to contain the character "S", "s", or "5"; "CB 2" is the second following character-block, having a probability of 80% to contain the character "y" and a probability of 15% to contain the character "g" or "j"; "CB 3" is the third character-block (following CB 2) and having a probability of 80% to containing the character "m" and a probability of 15% to contain the character "n"; and so on. Forming a matrix that scores this sequence of character-blocks against the search term "symbol" may result in the matrix of Table 1.

TABLE 1

|     | CB 1  | CB 2  | CB 3  | CB 4  | CB 5  | CB 6      |
|-----|-------|-------|-------|-------|-------|-----------|
| 80% | S/s/5 | Y     | M     | B/8/& | o/O/0 | l/i/l/I/! |
| 15% |       | g/j   | n     | E     | Q/C   | :         |
| s   | 0.00  | 7.91  | 15.81 | 26.42 | 34.33 | 42.23     |
| y   | 10.02 | 1.23  | 9.14  | 19.75 | 27.66 | 35.56     |
| m   | 20.04 | 11.26 | 2.47  | 13.08 | 20.98 | 28.89     |
| b   | 30.07 | 21.28 | 12.49 | 11.49 | 19.40 | 27.31     |
| o   | 40.09 | 31.30 | 22.51 | 21.51 | 12.73 | 20.63     |
| l   | 50.11 | 41.32 | 32.54 | 31.54 | 22.75 | 13.96     |

The scores in Table 1 are calculated using the algorithm from the "Dynamic Programming Algorithm for Sequence Alignment," by Lloyd Allison. From Table 1, the final score for the sequence of character-blocks against the search term "symbol" is 13.96. This final score may be good enough to deem the image as having the search term "symbol" in it. The location of "symbol" may be output by the processing 920 based on the location of the character-blocks forming the search term. That is, the location of the found search term is the location of the corresponding sequence of character-blocks in the image (e.g., defined by pixel location).

As can be appreciated, the pure adversarial approach takes an image and search terms as inputs, and outputs the search terms found in the image and the locations of the search terms. This advantageously provides a more accurate identification of search terms compared to conventional OCR approaches. For example, pure adversarial OCR processing does not necessarily require establishment of which letter, digit, or symbol a character-block contains. In contrast, traditional OCR approaches requires determination of which letter, digit, or symbol is in a character-block. This makes traditional OCR approaches vulnerable to anti-OCR features that use confusing and ambiguous characters, such as an upper case "i", a vertical bar, a lower case "l", a lower case "L", and an exclamation point, to name a few examples. Note that distinguishing between characters that may be in a character-block is not critical, and hence typically not performed, in phase 922 of the processing 920. This is because the processing 920 does not require conversion of an image into text to determine if a search term is present in the image. The processing 920 allows for determination of whether or not a search term is present in an image by working directly with the image. Phase 925 of the processing 920 allows lines of text containing any of the aforementioned ambiguous characters to be matched to search terms without particularly identifying a particular ambiguous character in a particular character-block.

Improved techniques for identifying text content in images have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of identifying text content in images, the method comprising:
   receiving an input image;
   splitting the image into a plurality of character blocks, each character block in the plurality of character blocks containing pixel information that may represent one or more characters;
   calculating a probability that a character block in the plurality of character blocks includes a character;
   forming a candidate sequence of character blocks from the plurality of character blocks, the candidate sequence of character blocks representing a candidate match for a search term; and
   comparing the candidate sequence of character blocks to the search term to determine if the search term is present in the candidate sequence of character blocks.

2. The method of claim 1 wherein comparing the candidate sequence of character blocks comprises calculating a similarity of a line of text in the candidate sequence of character blocks to the search term.

3. The method of claim 1 wherein the search term comprises a word or phrase indicative of spam.

4. The method of claim 1 wherein the search term comprises a link to a phishing site.

5. The method of claim 1 wherein the search term comprises company confidential or prohibited information.

6. The method of claim 1 wherein the one or more characters comprise an ASCII character.

7. A computer having a memory and a processor configured to execute computer-readable program code in the memory, the memory storing:
   an email processing engine configured to receive an email and extract an image from the email; and
   a pure adversarial optical character recognition (OCR) module configured to receive a search term and the image and to search the image for the search term;
   wherein the OCR module is configured to split the image into a plurality of character blocks, calculate a probability that a character block in the plurality of character blocks includes a character, create a candidate sequence of character blocks from the plurality of character blocks to form a candidate match for the search term, and compare the candidate sequence of character blocks to the search term to determine if the search term is present in the candidate sequence of character blocks.

8. The computer of claim 7 wherein the email processing engine is configured for antispam.

9. The computer of claim 7 wherein the email processing engine is configured for antiphishing.

10. The computer of claim 7 wherein the email processing engine is configured to check the email for confidential or prohibited information.

11. The computer of claim 7 wherein the OCR module is further configured to provide information on a location of the search term in the image if the search term is found in the image.

12. The computer of claim 7 wherein the OCR module is further configured to provide a location of the search term in the image when the search term is found to be similar to a line of text in the candidate sequence of character-blocks.

13. A computer-implemented method of identifying text content in images, the method comprising:
    extracting an image from an email; and
    searching the image for presence of a search term by splitting the image into a plurality of character blocks, each character block in the plurality of character blocks containing pixel information that may represent a character, calculating a probability that a character block in the plurality of character blocks includes a character, forming a candidate sequence of character blocks from the plurality of character blocks to form a candidate match for the search term, and comparing the candidate sequence of character blocks to the search term to determine if the search term is present in the candidate sequence of character blocks.

14. The method of claim 13 wherein determining if the search term is present in the candidate sequence of character blocks comprises calculating a similarity of a line of text to the search term.

15. The method of claim 13 wherein the search term comprises a word or phrase indicative of spam.

16. The method of claim 13 wherein the search term comprises a link to a phishing site.

17. The method of claim 13 wherein the search term comprises company confidential or prohibited information.

* * * * *